United States Patent [19]

Blackburn

[11] 3,890,739

[45] June 24, 1975

[54] METHODS OF PRODUCING GRASS CARPETS

[76] Inventor: Jack Blackburn, 103 Portland Rd., Birmingham B16 90X, England

[22] Filed: Aug. 15, 1973

[21] Appl. No.: 388,379

[30] Foreign Application Priority Data
Aug. 15, 1972  United Kingdom............. 37924/72

[52] U.S. Cl. ................................. 47/56
[51] Int. Cl. .............................. A01c 1/04
[58] Field of Search ................................ 47/56, 1

[56] References Cited
UNITED STATES PATENTS

| | | |
|---|---|---|
| 2,605,589 | 8/1952 | Kuestner................................ 47/56 |
| 2,876,588 | 3/1959 | Tietz et al........................... 47/56 X |
| 2,923,093 | 2/1960 | Allen..................................... 47/56 |
| 3,080,681 | 3/1963 | Merrill et al........................... 47/56 |
| 3,172,234 | 3/1965 | Eavis.................................. 47/56 X |

Primary Examiner—Robert E. Bagwill
Attorney, Agent, or Firm—Scrivener Parker Scrivener and Clarke

[57]     ABSTRACT

In a method of producing a grass carpet, a water impermeable sheet formed with a plurality of apertures is placed directly on a root impermeable surface and a mixture of grass seed and compost laid on top of the sheet. The size of the apertures is such that seed is unable to pass through the apertures. Preferably the sheet is a perforated plastic sheet and the root impermeable surface is a sheet of plastics material.

5 Claims, 2 Drawing Figures

METHODS OF PRODUCING GRASS CARPETS

This invention relates to methods of producing grass carpets on root impermeable surfaces.

Reinforced grass carpet has been produced on root impermeable surfaces by first laying a layer of soil, humus, compost, etc. directly in contact with the impermeable surface; then laying a reinforcement mat formed with apertures on top of the soil; and placing a second layer of soil, humus, compost, etc. on top of the mat, the seed being incorporated either in the first or second layer of soil. It has also been proposed to omit the first layer and to lay the reinforcement mat directly on the root impermeable surface.

The reinforcement mat used has been of closely woven water permeable material such as hessian, or has been of water impermeable material such as plastics in the form of a net. In the latter case however, the apertures have been much larger than the size of seed used.

My invention consists in a method of producing a grass carpet comprising laying directly on a root impermeable surface a sheet of water impermeable material formed with a plurality of apertures, and spreading grass seed and growing material such as soil, humus, compost, on top of the sheet, the size of the apertures in the sheet being such that said seed and material is prevented from passing through the apertures.

Because of the relative size and shape of the apertures in said sheet, substantially no grass seed or growing material penetrates between the sheet and the root impermeable surface and it is this fact which I consider contributes most to the quicker germination which I have found is obtained with the method according to the invention compared with the known methods referred to above. The sheet is then held in contact with the root impermeable surface over the whole of its lower surface area due to the weight of material above it, and I consider that water is thereby more effectively trapped between the sheet and root impermeable layer and encourages more rapid germination.

When the germinated grass carpet is subsequently lifted from the root impermeable surface, the latter is substantially clean, there being at least no recognizable layer of growing material thereon. Further, the underside of said sheet is covered with a network of clean roots. These facts attest to the correct choice of size and shape for the apertures in said sheet.

The grass seed and growing material can be mixed together and then spread over said sheet. Preferably, however, the grass seed is spread directly on top of said sheet and is then covered with the growing material. The roots of the germinating grass seeds then anchor themselves to the sheet soon after they begin to develop, and subsequently germination can proceed at the maximum rate possible. This compares more favourably than the arrangement with the seed mixed into the growing material as it then takes longer for the roots of the grass seeds to anchor themselves before germination can proceed at a maximum rate.

My invention is particularly applicable to climates where it is essential to conserve moisture in the subsoil and to prevent undue evaporation, the reinforcing mat then serving to limit such evaporation. In more temperate rainy climates the amount of penetration or soaking of water into the sub-soil can be adjusted by running a spiked roller over the area thus forming more holes in the carpet.

An example of the method of my invention will be described with reference to the accompanying drawing in which.

Figure 1:
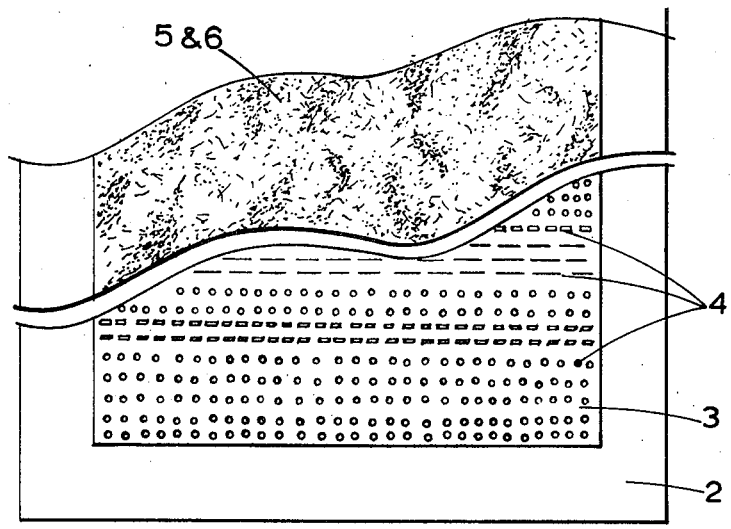
FIG. 1 is a plan view of a grass carpet partly in section.
Figure 2:
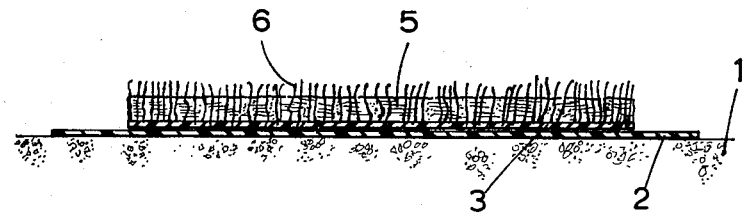
FIG. 2 is a section through FIG. 1.

The root impermeable surface is a level base 1 made from any reasonably smooth material such as concrete, timber, plastic, metal, polystyrene or polyurethane, plaster board, or asbestos cement, but it is preferable to first lay on such base a thin lightproof material 2 such as black plastic for reasons as explained later. This light-proof material is also root impermeable. Immediately on top of 2 a thin sheet of perforated plastic 3 is tautly laid, the perforations 4 being of such size and shape that grass seed will not pass through said perforations. A good way to prove the correct size of perforations is to make the perforated plastic into a bag containing the seed and, if on shaking, no seed is deposited the said perforated plastic is suitable for this invention.

It will be appreciated that the grass seed is elongate in shape and that it is the length of the seed along its longitudinal axis which should be referred to in determining the size and shape of the perforations in said sheet, the latter being substantially no wider at any part than the longitudinal length of the seed. It is not essential to remove the otherwise surplus material resulting from forming perforation in the plastic, even small cuts in the film are sufficient to promote root penetration.

Alternatively any water in permeable permanent load spreading sheet formed with apertures therein can be used, there being several proprietary materials on the market.

On top of the perforaated plastic 3 is then spread a layer, which can be as little as ⅛ inch thick, of soil, humus, compost, etc. 5, which can incorporate any necessary plant food. The seed can be spread on the perforated plastic first, or more easily prior mixed with the compost. Regular light watering is required and even outside the normal grass-growing season, with regulated climatic conditions a layer of grass carpet can be produced approximately every three weeks.

With the onset of germination the grass roots pass through the perforated plastic in search of moisture and condensation. The roots hit the impermeable root surface and knit together on the underside of the perforated plastic 3 thus the plastic becomes integral with the growing grass and root action.

As desired the whole grass carpet can be rolled up for transportation to its prepared site where after laying the roots turn downwards and establish themselves in the sub-soil. A further layer of soil can then be spread over the carpet, the grass quickly penetrating to the surface.

When using the proprietary load bearing reinforcing mat slightly marshy ground can be converted into light load bearing grass land.

The light proof membrane 2 is preferably wider and longer than the perforated plastic so that when rolled up the edges and the underside of the germinated roll are protected from sunlight. Sunlight destroys grass roots, hence is is preferable that even the perforated plastic 3 should be of black or light proof material. On laying the light proof membrane 2 is removed for reuse.

I claim:

1. A method of producing a grass carpet comprising laying directly on a root impermeable surface a sheet of water impermeable material formed with a plurality of apertures, spreading grass seed and growing material such as soil, humus, compost, on top of the sheet, the size and shape of the apertures in the sheet being such that said seed and material is prevented from passing through the apertures, and applying water to the growing material.

2. A method according to claim 1 wherein the sheet is perforated plastics sheeting.

3. A method according to claim 1 wherein the root impermeable surface comprises a sheet of impermeable material.

4. A method according to claim 3 wherein both the first and second sheets are light-proof.

5. A method according to claim 1 in which the grass seed is spread directly on the sheet and is covered with the growing material.

* * * * *